Dec. 27, 1966  F. E. CERISANO  3,294,348
HOLDER FOR SOLDERING IRONS AND THE LIKE
Filed March 3, 1965  2 Sheets-Sheet 1

INVENTOR.
FRANCIS E. CERISANO
BY Byerly, Townsend, Watson
& Churchill

Dec. 27, 1966  F. E. CERISANO  3,294,348
HOLDER FOR SOLDERING IRONS AND THE LIKE
Filed March 3, 1965  2 Sheets-Sheet 2
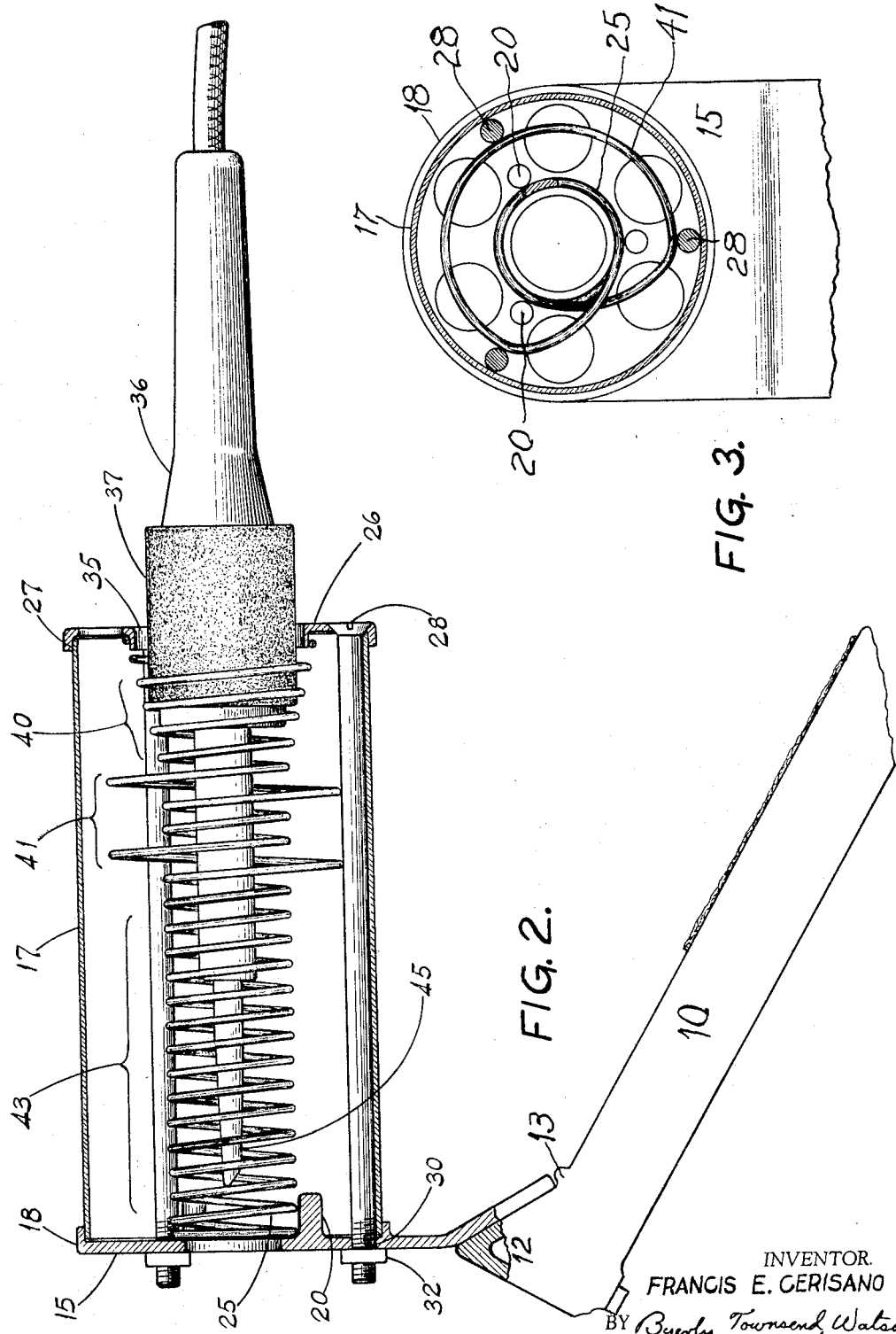
INVENTOR.
FRANCIS E. CERISANO
BY Byerly, Townsend, Watson
& Churchill 3,294,348
HOLDER FOR SOLDERING IRONS AND THE LIKE
Francis E. Cerisano, 94 Lawrence St.,
Farmingdale, N.Y. 11735
Filed Mar. 3, 1965, Ser. No. 436,820
5 Claims. (Cl. 248—44)

This invention relates to a holder for soldering irons and the like.

In the use of soldering irons and other electrically heated tools it is common practice to insert the hot iron in a holder for short periods of time during assembly operations without disconnecting the iron from the electric outlet or otherwise permitting the iron to cool. Such holders serve the dual purpose of protecting the operator or other workers from accidental contact with the heated iron and the possibility of flesh burns, and also avoids the loss in time which would be occasioned by reheating the soldering iron during intermittent assembly operations.

The primary object of the present invention is to provide a holder for heated soldering irons and the like which is of relatively simple construction, which lends itself to ease of manufacture, and which is arranged so that it will virtually eliminate the possibility of flesh burns, if the operator or other workers should accidentally contact the exterior of the holder while the heated soldering iron is located in the same.

The second object of the invention is to provide such a holder for soldering irons or the like which will minimize the loss of heat at the soldering iron tip while in the holder.

According to the present invention I provide a holder for soldering irons and the like having a supporting base member, an outer perforated cage to provide a minimum of metallic wall surface and a maximum open area, and a continuous coil within such cage member and spaced therefrom, said coil having an inwardly tapered section at one end, at least two enlarged loops intermediate its ends which serve to space the coil from the cage, and a third section to receive the heated tip of the soldering iron in spaced relation therewith and to maintain it out of contact with the end wall of the cage—the tapered section at one end being adapted to receive and to accommodate the enlarged handle of the soldering iron with its cork or other insulating covering and thereby to center the heated tip of the iron within the coils of the third section and out of contact with the same.

One embodiment of the invention is shown in the accompanying drawings wherein:

FIG. 2 is a view partly in axial section of the soldering iron holder of FIG. 1 with a soldering iron assembled therewith; and FIG. 3 is an end view of the soldering iron holder viewed from the right in FIG. 2 with the soldering iron omitted and certain parts being shown in section and others being shown in elevation for clarity.

Figure 1:
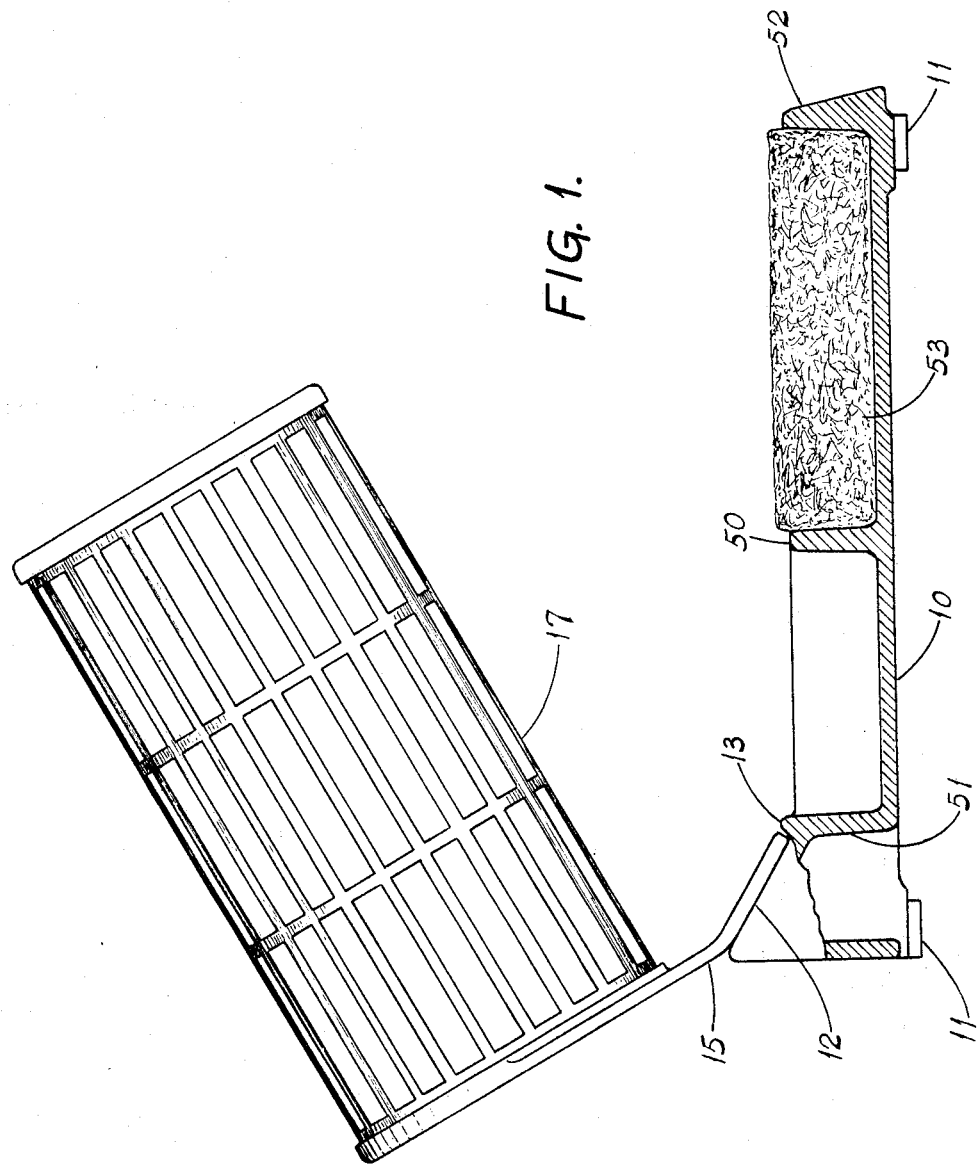
FIGURE 1 is a side elevational view, partly in section, of the soldering iron holder of my invention.

Referring now more particularly to the drawings it will be noted that the holder consists of a cast base member 10 of sufficient weight and strength to support the cage and associated parts. The base 10 is preferably of rectangular shape and is provided adjacent its corners with insulating feet 11 which are pressed into holes provided in the bottom surface.

At the left end of the base, as seen in FIG. 1, there is an inclined boss 12 having a lateral lip 13 which serves to support and position a supporting bracket 15 for the cage member 17 and associated parts.

The supporting bracket or rear plate 15 is provided with a peripheral flange 18 for retaining one end of the cage 17. The supporting bracket 15 is also provided with three inwardly directed bosses 20 which are preferably equidistantly spaced radially of the axis of the cage 17 and serve to position and support one end of the spiral coil 25. A front plate 26 having an inturned peripheral flange 27 engages the opposite end of the cage 17, said plate 26 having three holes provided therein which accommodate the heads of stove bolts 28 which extend through the cage and through holes 30 provided in the supporting bracket 15, such stove bolts being retained in place by nuts 32 which are in threaded engagement therewith and abut the outer face of the supporting bracket. It will be understood that the stove bolts 28 maintain the cage 17 in assembled relation with the bracket 15 and the front plate 26.

Centrally of the front plate 26 is an opening 35 of sufficient diameter loosely to receive and accommodate the handle of a soldering iron 36 preferably having a heat-insulating sleeve 37 of cork, asbestos or the like.

As will best be seen in FIG. 2 the coil 25 is preferably of a continuous spiral having three distinct sections. The first section is inwardly tapered as shown at 40 of FIG. 2 so as to receive and hold in firm engagement the forward end of the insulating sleeve 37 of the soldering iron. The second section 41 as shown in FIG. 2, comprises at least two enlarged loops of sufficient diameter to make direct contact with and be retained by the stove bolts 28 which then serve correctly to position the coil with respect to the outer cage 17. The third section 43 of the continuous coil is of a diameter such that it will fit within and be retained by the three bosses 20 while maintaining the heated tip 45 of the soldering iron out of contact with and spaced from said coil.

By referring to FIG. 1 it will be noted that the cast base member 10 has two compartments in its upper surface which are provided by a transverse flange 50 and end walls 51, 52. Compartment 53 accommodates a sponge or other wiping medium for conveniently cleaning the soldering iron tip during use.

With the holder of the present invention it has been found in practice that if the cage 17 is perforated or slotted as shown in FIG. 1 to provide approximately 65% air spaces and 35% metal surfaces, and the tapered end of the inner coil only engages the insulating sleeve on the soldering iron handle and all other parts of the soldering iron, including the tip, are maintained out of contact with the coil and spaced therefrom, the heat from the soldering iron is dissipated so well that accidental contact with the cage while the heated soldering iron is in the holder will not cause flesh burns. Thus, with the holder of this invention it has been found possible greatly to minimize the incidence of accidental flesh burns during assembly operations, to increase the useful life of soldering tips, and to maintain efficient production by not having repeatedly to reheat the soldering iron during intermittent assembly steps.

While I have shown and described the preferred embodiment of my invention, it will be understood that it is adaptable to other forms within the scope of the appended claims.

What I claim is:

1. A holder for a heated soldering iron comprising a base member, a perforated cage member supported thereby, and an axially disposed coil within said cage for receiving and retaining said iron with the heated tip thereof in spaced relation to said coil, said coil having at least two loops of sufficiently larger diameter to maintain the coil in spaced relation with said cage.

2. A holder for a heated soldering iron comprising a base member, a perforated cage member supported thereby, and an axially disposed coil within said cage, said coil having a first section which is inwardly tapered to receive and retain the insulated handle of a soldering iron and to maintain the heated iron out of contact with said coil, said coil having a second section having at least two loops of sufficiently larger diameter to maintain the coil in spaced relation with said cage.

3. A holder for a heated soldering iron comprising a base member, a perforated cage member supported thereby, and an axially disposed coil within said cage, said coil having three sections, the first such section being tapered inwardly to receive and retain the insulated handle of a soldering iron, the second such section having at least two loops of sufficiently larger diameter to maintain the coil in spaced relation with said cage, and the third such section being of substantially uniform smaller diameter to surround the heated tip of a soldering iron in spaced relation therewith.

4. A holder for a heated soldering iron comprising a base member, a perforated cage member supported thereby, a front plate for said cage having an opening therein of such size as to accommodate the insulated handle of a soldering iron, a rear plate for said cage having a plurality of inwardly directed spaced bosses thereon, and an axially disposed coil within said cage, said coil having a first section adjacent said opening in the front plate which is inwardly tapered to receive and retain the insulated handle of a soldering iron and to maintain the heated iron out of contact with said coil, the coil having a second section having at least two loops of sufficiently larger diameter to maintain the coil in spaced relation with said cage, and said coil having a third section of substantially uniform smaller diameter, the end loop of said third section being retained in position by said bosses on the rear plate.

5. A holder for a heated soldering iron according to claim 4, having at least three substantially equally spaced longitudinal rods within the cage and exteriorly of the coil, said rods connecting said front and rear plates and also being engaged by the loops of the second section of the coil, whereby said coil is maintained laterally in spaced relation to said cage.

References Cited by the Examiner
UNITED STATES PATENTS

| | | | |
|---|---|---|---|
| 905,944 | 12/1908 | Southard | 131—257 |
| 1,616,721 | 2/1927 | Vallin | 248—44 |
| 2,172,682 | 9/1939 | Rauba | 248—44 |
| 2,174,230 | 9/1939 | Shangle | 248—176 |

CLAUDE A. LEROY, *Primary Examiner.*
K. J. WINGERT, *Assistant Examiner.*